(12) United States Patent
Kurtz, Jr. et al.

(10) Patent No.: US 6,692,674 B1
(45) Date of Patent: Feb. 17, 2004

(54) DISCRETE FASTENER REGIONS

(75) Inventors: Wallace L. Kurtz, Jr., Lunenburg, MA (US); Ernesto S. Tachauer, Bedford, NH (US); Brian J. Vanbenschoten, Rochester, NH (US); William L. Huber, Epsom, NH (US)

(73) Assignee: Velcro Industries B.V., Curacao (NL)

( * ) Notice: Subject to any disclaimer, the term of this patent is extended or adjusted under 35 U.S.C. 154(b) by 0 days.

(21) Appl. No.: 10/306,058

(22) Filed: Nov. 27, 2002

(51) Int. Cl.⁷ .................... B29C 45/04; B29C 53/00; B32B 7/02; A44B 18/00
(52) U.S. Cl. .................. 264/167; 264/166; 264/251; 264/239; 264/479; 428/99; 24/442; 24/451; 24/452
(58) Field of Search ................. 264/239, 251, 264/166, 252, 167, 479; 428/99; 156/322; 24/442, 451, 452, 444

(56) References Cited

U.S. PATENT DOCUMENTS

| | | | | |
|---|---|---|---|---|
| 4,097,634 A | * | 6/1978 | Bergh | 428/156 |
| 4,732,800 A | | 3/1988 | Groshens | |
| 4,794,028 A | * | 12/1988 | Fischer | 264/167 |
| 5,260,015 A | * | 11/1993 | Kennedy et al. | 264/167 |
| 5,441,687 A | * | 8/1995 | Murasaki et al. | 264/167 |
| 5,948,337 A | * | 9/1999 | Sakakibara et al. | 264/167 |
| 6,132,660 A | * | 10/2000 | Kampfer | 264/167 |
| 6,143,222 A | * | 11/2000 | Takizawa et al. | 264/167 |
| 6,287,665 B1 | | 9/2001 | Hammer | |
| 2001/0001283 A1 | | 5/2001 | Kennedy et al. | |
| 2001/0018110 A1 | | 8/2001 | Tuman et al. | |

FOREIGN PATENT DOCUMENTS

| | | |
|---|---|---|
| EP | 0324577 | 7/1989 |
| EP | 741979 | 4/2001 |
| WO | WO 95/03723 | 2/1995 |
| WO | WO 00/00053 | 6/1998 |
| WO | WO 00/50229 | 8/2000 |

* cited by examiner

Primary Examiner—Victor Sakran
(74) Attorney, Agent, or Firm—Fish & Richardson P.C.

(57) ABSTRACT

A fastener product includes a planar base, multiple discrete plateaus molded integrally with and extending from an upper surface of the base each plateau having an upper surface that is smaller in area than an overall area of the base covered by the plateau, and an array of discrete fastener elements integrally molded with and extending from the upper surface of the plateau. The product is molded on a mold roll covered by a sleeve either made of a resilient material or having apertures intersecting an inner surface of the sleeve at an inner opening that is smaller than an outer opening of the aperture at an outer sleeve surface to form an edge of the fastener product of decreased sharpness.

29 Claims, 7 Drawing Sheets

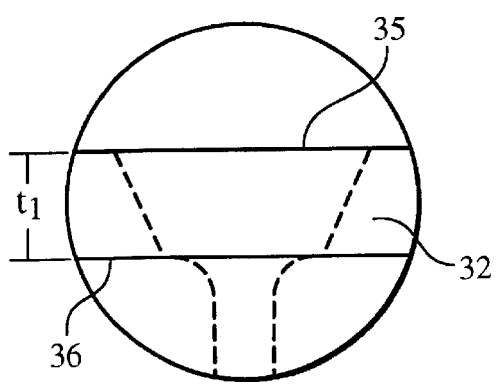
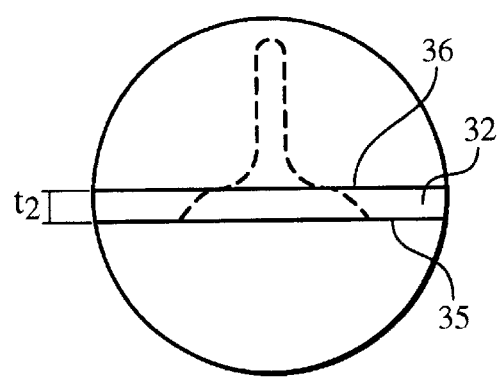
FIG. 5A    FIG. 5B
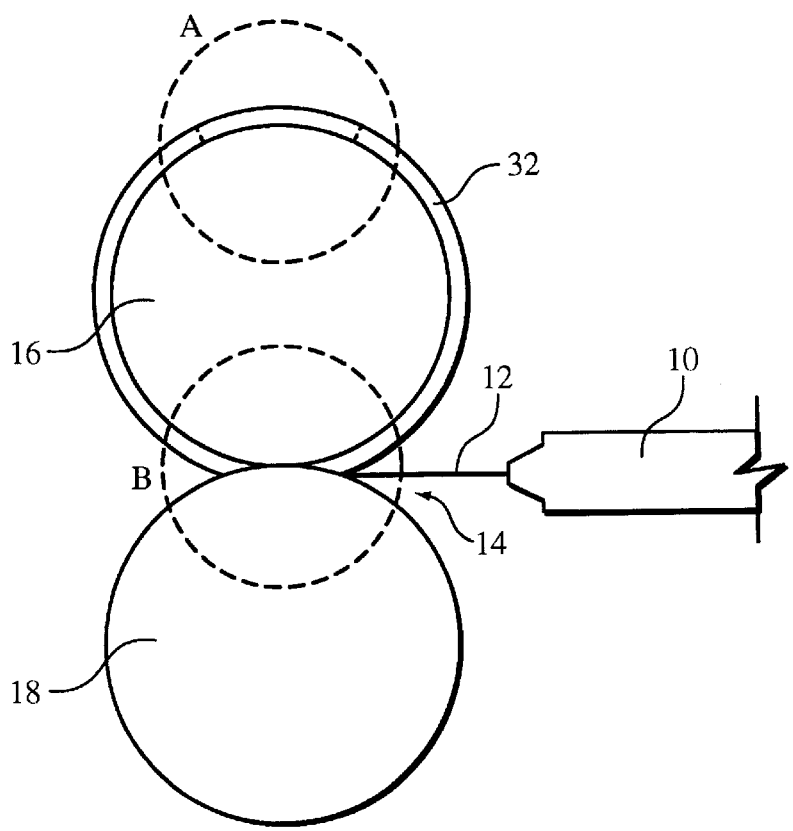
FIG. 5

US 6,692,674 B1

DISCRETE FASTENER REGIONS

TECHNICAL FIELD

This invention relates to discrete fastener regions, and more particularly to fastener elements, capable of engaging a material, extending from discrete regions of a base or substrate.

BACKGROUND

Fastener products having a base substrate with fastener elements for engagement with loops or like fastener elements can be continuously produced from, e.g., a thermoplastic material. Typically, methods for producing such fastener products result in tape-like substrates having a continuous pattern of fastener elements extending across an entire surface or in uniform bands or rows along the length of the substrate. Often times, however, it would be advantageous in applications for such fastener products, to have the presence of the fastener elements limited to pre-selected zones or arranged in patterned areas along the substrate.

For example, there are some applications where it would be desirable to have patterned fastener element, e.g., hook, areas with adjacent areas that lack fastener element protrusions on a common web. Currently any such fastener products are generally made by multi-step forming, cutting and joining operations because most hook products are limited to complete or at least continuous hook coverage across or along the length of the hook bearing web. Providing hook products having other configurations would generally require specially designed tooling, e.g., hook forming mold cavity rolls with flat areas and hook forming cavity areas in the desired configuration. However, if the desired hook bearing shape and/or pattern were subsequently changed, the specialty tool would require redesign and or rebuilding to accommodate the change.

SUMMARY

In an aspect, a method of making a fastener product having discrete regions of fastener element stems extending from a section of a strip-form base is provided. The method includes: providing a gap formed along a peripheral surface of a rotating mold roll; the mold roll having a plurality of cavities extending from the peripheral surface; positioning a compliant sleeve about the mold roll, the sleeve covering select ones of the plurality of cavities; continuously introducing molten resin to the gap such that the resin forms at least a part of the strip-form base of the product at the peripheral mold roll surface and at least partially fills a plurality of the cavities and the aperture, while the resin remains blocked from said selective ones of the cavities by the sleeve, to form fastener element stems as projections extending from the section, the section extending from the strip form base, the sleeve compressing under pressure in the gap; solidifying the resin; and stripping the solidified resin from the peripheral surface of the mold roll by pulling the projections from their cavities.

In another aspect, a method of making a fastener product having discrete regions of fastener element stems extending from a base includes: providing a gap formed along a peripheral surface of a rotating mold roll, the mold roll having an array of cavities extending from the peripheral surface; positioning a sleeve about the mold roll, the sleeve having an outer surface and an inner surface and defining at least one aperture extending between the inner and outer surfaces to expose a region of the array of cavities, the aperture intersecting the inner surface of the sleeve at an inner opening that is smaller than an outer opening of the aperture at the outer sleeve surface; introducing the sleeve to the gap; continuously introducing molten resin to the gap such that the resin forms at least a part of the strip-form base of the product at the peripheral mold roll surface and at least partially fills the region of the array of cavities and the aperture to form fastener element stems as projections extending from an upper surface of a plateau, the plateau molded integrally with and extending from the base and the upper surface of the plateau is smaller in area than an overall area of the base covered by the plateau; solidifying the resin; and stripping the solidified resin from the peripheral surface of the mold roll by pulling the projections from their cavities.

Some embodiments include a compliant sleeve. In some cases the sleeve resiliently compresses, (i.e, the sleeve has an elastic property allowing portions of the sleeve, following compression, to at least substantially assume its original, uncompressed configuration once outside a pressure region, for example, once outside the gap region). In some embodiments, the compliant sleeve is resiliently expanded about the mold roll. This expansion allows for positioning of the mold roll sleeve about the mold roll.

Some embodiments include a mold roll sleeve having an aperture that includes a chamfered or a radiused edge. Chamfered or radiused edges of the aperture form a fastener product having a corresponding chamfered or radiused edge.

In some versions, the cavities of the mold roll comprise a number of shapes allowing for the formation of a variety of projections. For example, the cavities can be stem-shaped thus forming projections extending from the section to a distal tip of the projection. The distal tips of the projections can then be post-formed, including deforming the distal tips to form loop-engaging heads on the projections. In some embodiments, the cavities include a loop-engaging head shape thus forming projections with loop-engaging heads. The loop-engaging head shapes can be hooks, for example.

Some embodiments also include introducing a backing material to the molten resin while the resin is disposed in the gap. The backing material can be a nonwoven, printable cloth, plastic film, a resiliently extensible material, paper, woven fabric or the like, as examples.

In another aspect, a fastener product includes a planar base, multiple discrete plateaus molded integrally with and extending from an upper surface of the base each plateau having an upper surface that is smaller in area than an overall area of the base covered by the plateau, and an array of discrete fastener elements integrally molded with and extending from the upper surface of the plateau.

In another aspect, a fastener product includes a base comprising a first material, a plateau molded integrally with and extending from the base and having an upper surface that is smaller in area than an overall area of the base covered by the plateau, the plateau having at least one layer comprising a second material, and an array of fastener elements integrally molded with and extending from the upper surface of the plateau.

Various embodiments include fastener elements of different shapes including hook-shapes and/or mushroom-shapes, for example. In some embodiments, the plateaus include a radiused and/or a chamfered edge allowing for a relatively smooth transition from a surface of the base to an upper surface of the plateau. An advantage of this smooth transition, among others, is that the radiused or chamfered edge provides a softer "feel" for a user coming in contact with a surface of the fastener product.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 illustrates a compressed mold roll sleeve positioned about a mold roll.

FIG. 5A is a detail view of an uncompressed mold roll sleeve.

FIG. 5B is a detail view of a compressed mold roll sleeve.

Like reference symbols in the various drawings indicate like elements.

DETAILED DESCRIPTION

Figure 1:
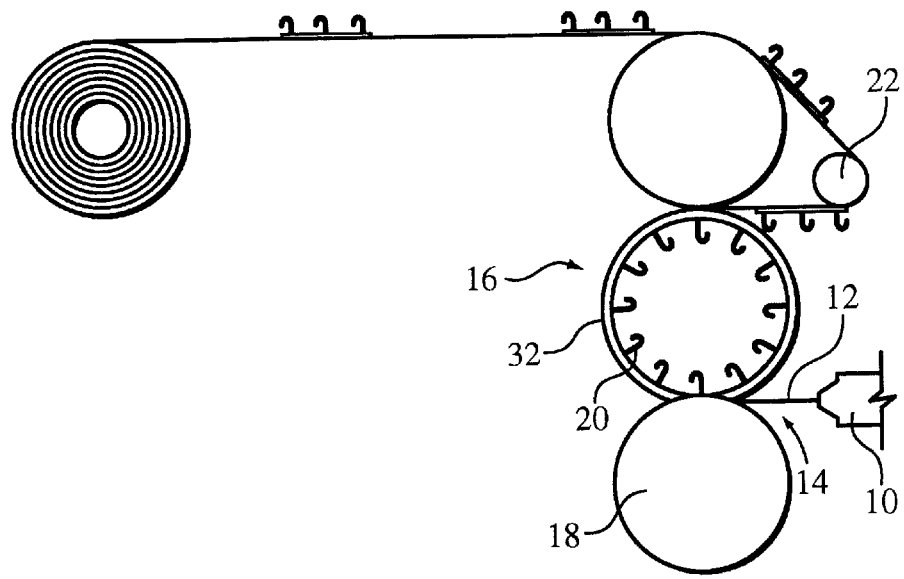
FIG. 1 illustrates a method and apparatus used to form a fastener product.
Figure 2:
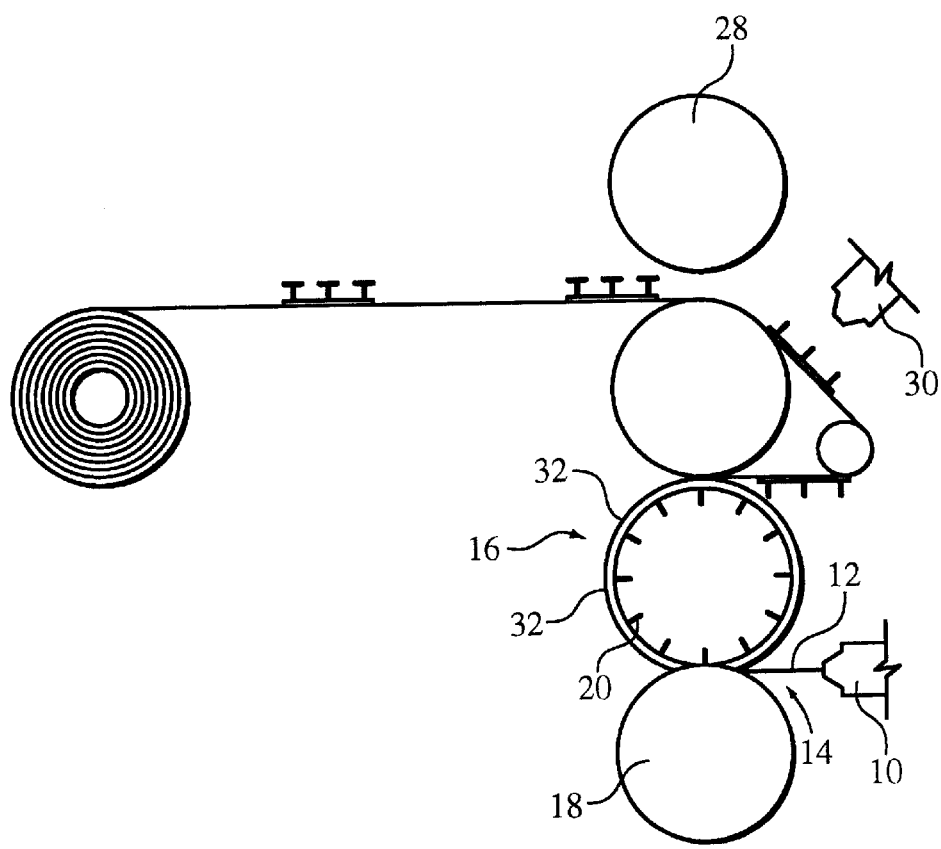
FIG. 2 illustrates a method and apparatus for forming a fastener product.

Referring to FIGS. 1 and 2, methods of producing fastener products are shown. The methods build upon the continuous extrusion/roll-forming methods for molding fastener elements on an integral, sheet-form base described by Fischer in U.S. Pat. No. 4,794,028, and the nip lamination processes described in Kennedy, et al. in U.S. Pat. No. 5,260,015, the details of both of which are incorporated herein by reference. The relative positions and sizes of the rolls and other components illustrated in FIGS. 1 and 2 are schematic and are not to scale. Referring particularly to FIG. 1, an extrusion head 10 supplies a continuous sheet of molten resin 12 to a nip or gap 14 between a molding roll 16 and a counter rotating pressure roll 18. Mold roll 16 contains an array of miniature, mold cavities 20 extending inward from its periphery for molding at least a portion of the fastener elements. The array of cavities 20 extends substantially about the entire periphery of mold roll 16. Pressure in the nip 14 forces resin 12 to enter and at least partially fill the exposed mold cavities 20, while excess resin forms a base substrate from which the fastener elements extend, as further described below. The formed product is cooled on the mold roll until the solidified fastener elements (e.g., hooks) are stripped from their fixed cavities by a stripper roll 22.

Referring still to FIG. 1, in some embodiments, cavities 20 of mold roll 16 have a stem forming portion and an engaging head forming portion so as to form stems having engaging heads during the molding process. The result, for example, can be a fastener product having molded fastener elements with hooks that overhang a base. In these embodiments, the solidified product stripped from mold roll 16 has fastener elements capable of engagement. Referring now to FIG. 2, in other embodiments, cavities 20 of mold roll 16 have only a stem forming portion. In these embodiments, the product stripped from mold roll 16 has stems, extending from the base that can be post-treated to form engaging heads. For example, after molding and stripping the product from mold roll 16, the tops of the molded stems can be deformed by pressure with a pressure roller 28 and/or heated with a heater 30 to create discs or other shapes that overhang the base of the product and are capable of engaging, e.g., loop material or like fastener elements. Additionally, a backing material, such as a preformed film, a loop material, a printable cloth, a resiliently extensible material, paper, a woven or the like, may be introduced into the nip to form a fastener product having a backing substrate.

Referring now to FIGS. 1 and 2, mold roll 16 has a mold roll sleeve 32 positioned about the periphery of mold roll 16. Sleeve 32 is positioned over the peripheral molding surface of mold roll 16 during the molding process so that the sleeve serves as a barrier to prevent molten resin 12 from entering mold cavities that do not correspond with openings while allowing resin to enter cavities that do correspond with openings.

Figure 3:
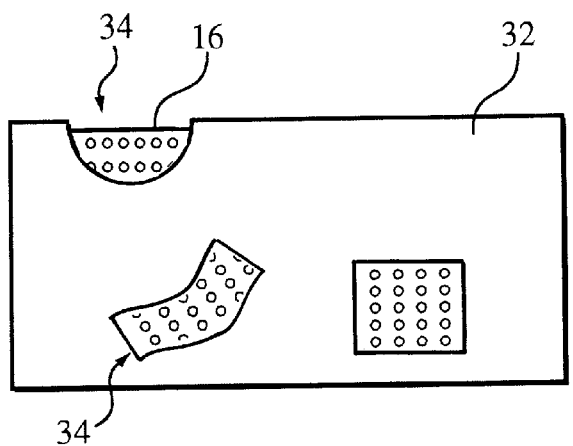
FIG. 3 illustrates a mold roll sleeve positioned about a mold roll.
Figure 4A:
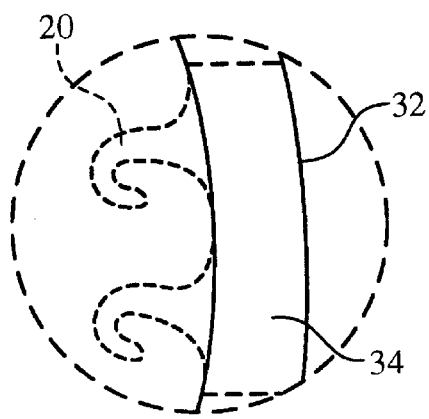
FIG. 4A is a detail illustration of a portion of the mold roll and mold roll sleeve.
Figure 4:
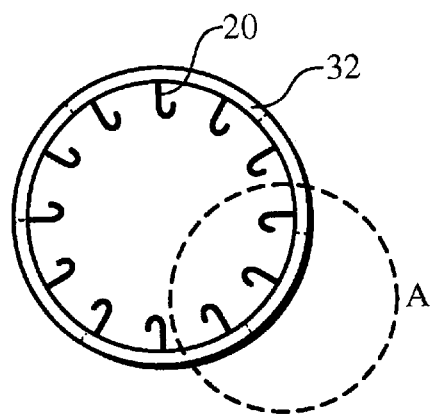
FIG. 4 illustrates a side view of a mold roll sleeve positioned about a mold roll.

FIGS. 3–4A illustrate a sleeve 32 positioned about the peripheral molding surface of a mold roll 16. Referring now to FIG. 3, sleeve 32 contains apertures 34 exposing select areas of the peripheral molding surface of the mold roll 16. Although select areas of the mold roll surface are exposed, other areas are blocked thus preventing the flow of resin into select cavities 20.

Referring to FIG. 4, a side view illustration of a mold roll 16 having a sleeve 32 positioned about its molding surface is shown. Apertures 34 extend from an outer surface of sleeve 32 to an inner surface of sleeve 32 to expose hook-shaped cavities 20. See also FIG. 4A. Mold roll sleeve 32 is comprised of a compliant material, (i.e., a material that has a hardness of, for example, less than 90 Shore D) that allows the sleeve 32 to compress as the sleeve 32 and resin enter the nip or gap of the mold roll 16 and the pressure roll 18. See FIG. 5. This compression of the sleeve 32 decreases the outer diameter of the sleeve 32 and mold roll 16 assembly, at least in the nip region.

Referring now to FIG. 5A, a detailed view of mold roll sleeve 32 is shown in an uncompressed state. The distance from the outer surface 35 of the sleeve 32 to the inner surface 36 of the sleeve 32 is "$t_1$." Referring now to FIG. 5B, a detailed illustration of the sleeve 32 is shown in a compressed state. As shown, the profile of the sleeve 32 is reduced. This reduction in profile is caused, for example, by the pressure exerted against the outer surface 35 of the sleeve 32 by the resin and the pressure roll. The distance from the outer surface 35 of the sleeve 32 to the inner surface 36 of the sleeve is given by "$t_2$." Due to the compression, the distance $t_1$ is greater than $t_2$.

Figure 6:
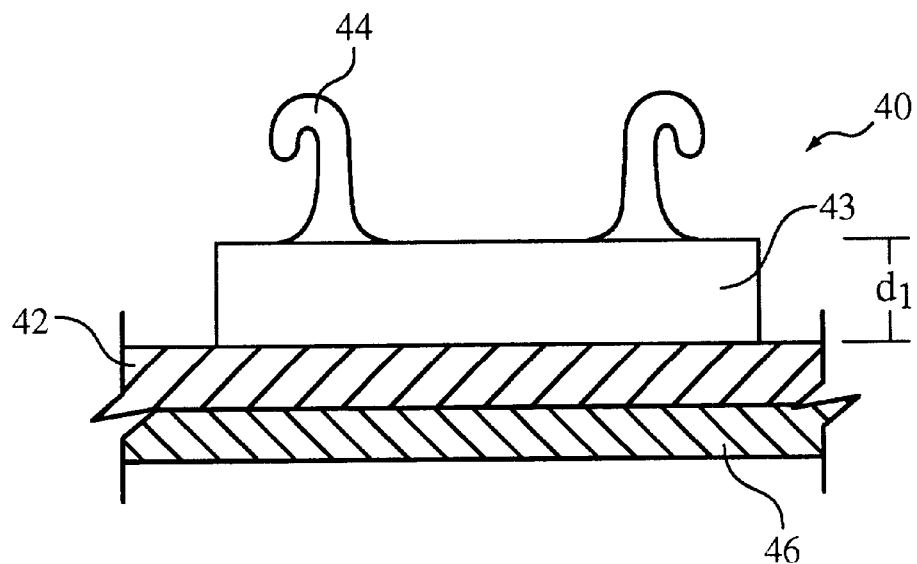
FIG. 6 is a fastener product formed by a noncompliant mold roll sleeve.
Figure 7:
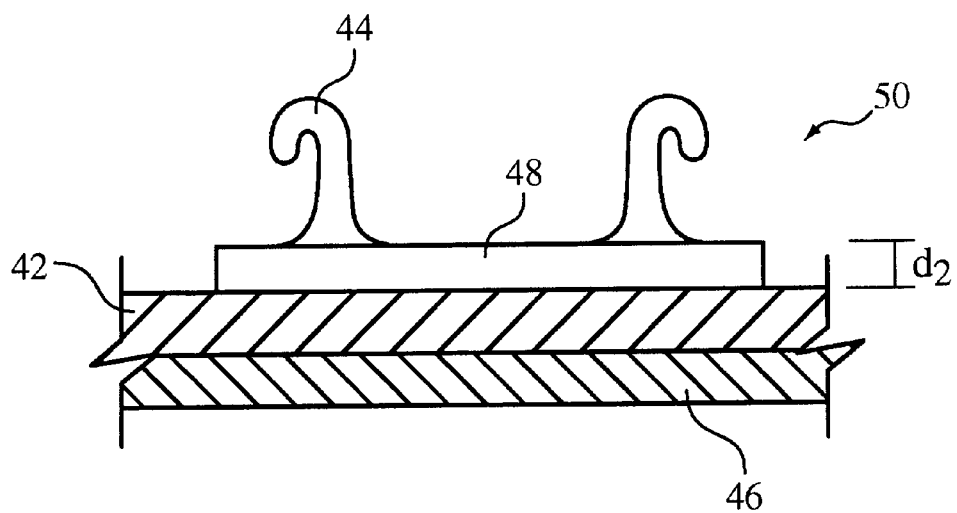
FIG. 7 is a fastener product formed by a compliant mold roll sleeve.

Referring to FIGS. 6 and 7, fastener products 40 and 50 are illustrated. Referring particularly to FIG. 6, fastener product 40 was formed using a sleeve having a wall thickness $t_1$, formed of non-compliant material (i.e., the material has a relatively high hardness, for example, greater than 90 Shore D). Fastener product 40 comprises a sheet-form base of resin 42 having fastener elements 44 extending outwardly from plateau 43, which is integrally molded with base 42. Fastener product further includes a backing material 46, e.g., a non-woven, woven, film, loop material, paper, etc., bonded to a surface of the resin base 42. As noted, base 42 includes plateau 43. Plateau 43 is formed by the "cavity" provided by the aperture 34. The distance, $d_1$, corresponds to the distance between an outer surface of the base 42 to an upper surface of the plateau 43 and is approximately equal to $t_1$. See FIG. 5A.

By contrast, referring now to FIG. 7, fastener product 50, formed using a compliant mold roll sleeve 32 having an uncompressed wall thickness ($t_1$) and a compressed wall thickness ($t_2$), is shown. Fastener product 50 also comprises a sheet-form base of resin 42 having fastener elements 44 extending from plateau 48, which is integrally molded with base 42. Fastener product 50 also includes a backing material 46, e.g., a non-woven, woven, film, loop material, paper, etc., bonded to a surface of the resin base 42. As noted, fastener product 50 includes a plateau 48 extending from the surface of the base 42 formed by the "cavity" provided by the aperture 34. As can be seen, the distance $d_2$ is less than the distance $d_1$ of the product 40 of FIG. 6. This is accomplished by employing the compliant sleeve 32 having a compressed wall thickness, $t_2$, that is less than the uncompressed thickness, $t_1$. Because $t_2$ is approximately equal to $d_2$, $d_2$ is less than $d_1$. See also FIG. 6.

Figure 8:
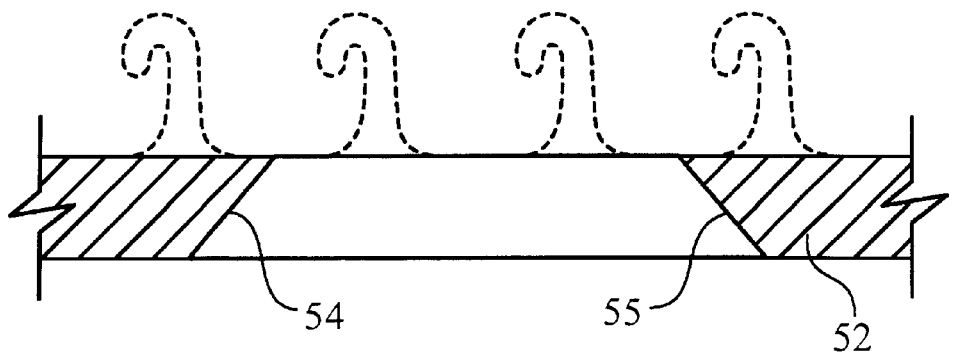
FIG. 8 is a mold roll sleeve with a chamfered edge.

FIG. 8 shows a mold roll sleeve 52 having chamfered edges 54 and 55. While chamfered edges 54 and 55 extend from an outer surface 56 of the sleeve 52 to an inner surface 58 of the sleeve 52, the edges 54 and 55 may also be only partially chamfered. While edges 54 and 55 are chamfered, the edges could include a radius or other like configuration.

Chamfered edges may be formed by a variety of techniques including laser cutting, machining, etching, including photochemical etching and/or the like. Edges 54 and 55 are chamfered at 45 degrees, but the edges may be chamfered at an angle less than 90 degrees.

Figure 9:
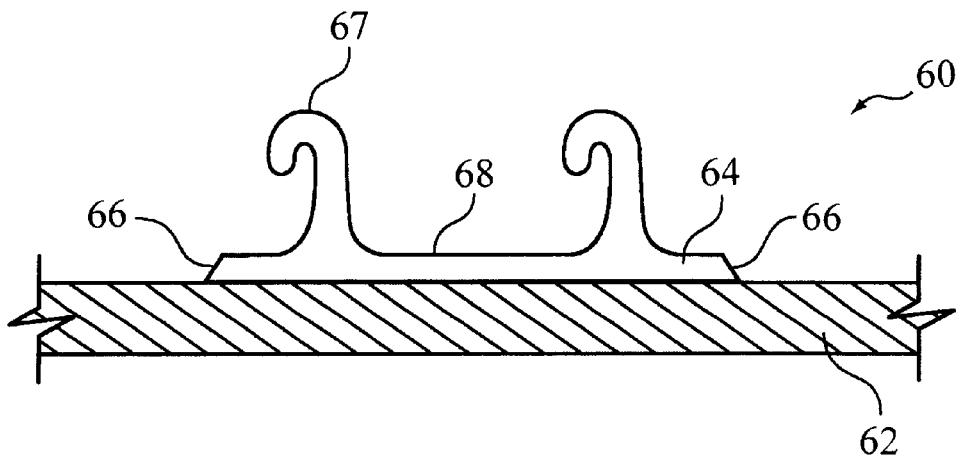
FIG. 9 is a molded product having a plateau integral with a chamfered edge.

Referring now to FIG. 9, a fastener product 60 made in accordance with one or more of the above embodiments is illustrated. Fastener product 60 includes a base 62 and a plateau 64 integral with the base 62 having fastener elements 66 extending from plateau 64. Fastener elements 66 comprise hooks, but may also be formed as, for example, mushrooms, flat tops, and/or stems. Plateau 64 also includes edge(s) 66 that are chamfered, providing a relatively smooth transition from the sheet-form base 62 to a surface 68 of plateau 64. While edge(s) 66 are chamfered at an angle less than 90 degrees, e.g., a 45 degree chamfer, the edges could include a radius or other like configuration.

Figure 10:
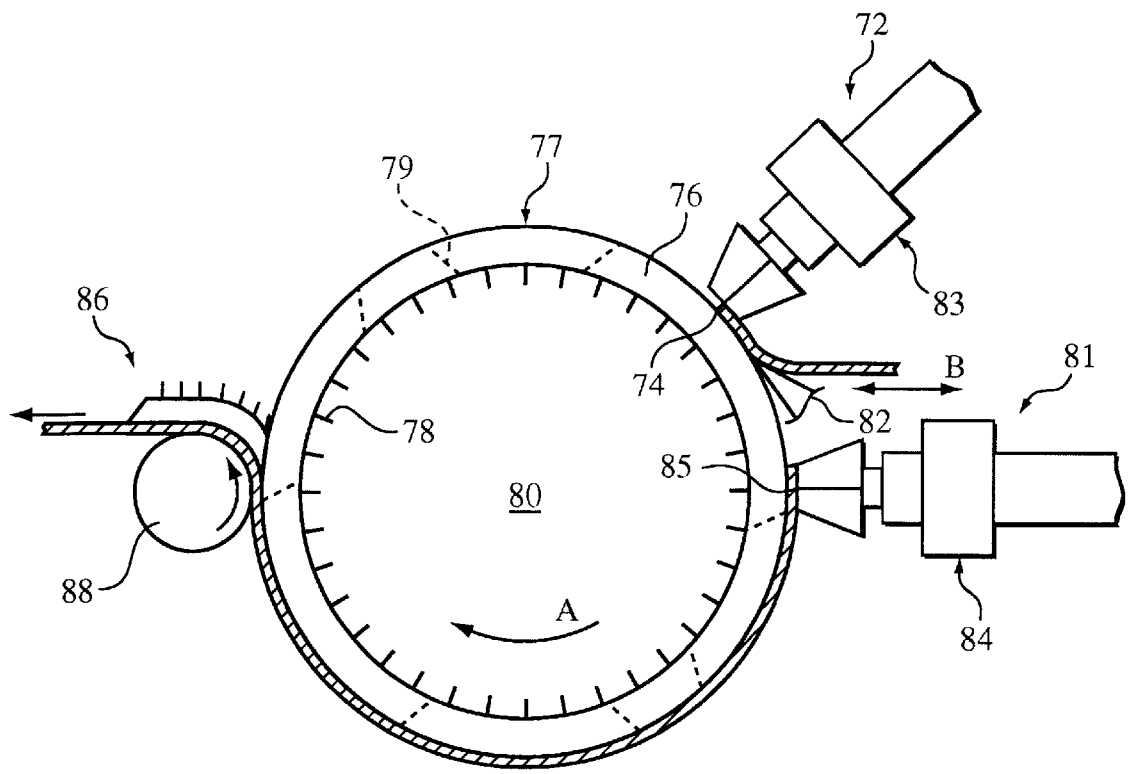
FIG. 10 illustrates a method and apparatus used to form a multi-layer fastener product.
Figure 11:
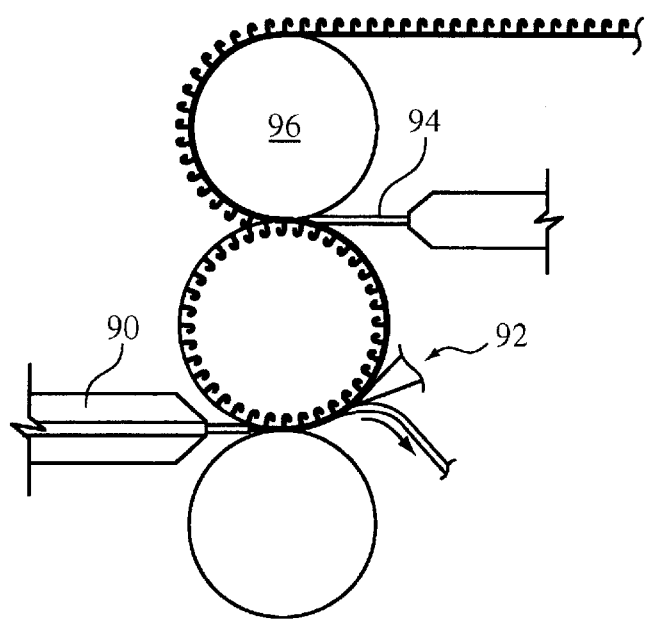
FIG. 11 illustrates a method and apparatus used to form a multi-layer fastener product.

Referring now to FIGS. 10 and 11, suitable processes for forming a two-polymer fastener are shown. Referring particularly to FIG. 10, a first extruder 72 extrudes a first, hook-forming polymer 74 onto mold roll sleeve 76. Mold roll sleeve 76 can be formed of either a compliant or a non-compliant material, as noted above. The mold roll sleeve 76 includes apertures 77 having radiused edge 79. It should be noted that while edge 79 is shaped to form a product with a convex edge, edge 79 can be shaped to form a product with a concave edge. The extruder 72 forces some of the polymer into hook-forming cavities 78 and leaves a layer of polymer on the surface of the mold roll sleeve 76. As mold roll 80 rotates in the direction of arrow A, doctoring blade 82 removes some or the entire polymer on the surface of the mold roll without disturbing the polymer in cavities 78. The removed polymer, which has been exposed to air while on the mold roll sleeve 76 and may have begun to solidify, may be either discarded or returned to a hopper for remelting. The thickness of polymer left on the surface of the roll sleeve by the doctoring blade will depend, in part, on how close the blade is positioned to the surface of the mold roll (the position is adjustable in the direction indicated by arrow B). In some cases, the sharp, distal end of blade 82 rides against the mold roll sleeve, thereby literally scraping off essentially the entire polymer on the surface of the sleeve. In such cases it is recommended that the end of the blade be coated with a lubricious material to avoid damaging the surface of the mold roll sleeve. In other cases, the position of the blade is adjusted to leave a predetermined thickness of polymer on the sleeve, to become a part of the base of the product. In such cases, the doctoring blade effectively trims the polymer thickness rather than actually "scraping" against the surface of the mold roll sleeve. Next, a second extruder 81 extrudes a second, base-forming polymer 85 onto the surface of the mold roll sleeve (or onto any of polymer 74 left on the surface of the roll by blade 82). A gear pump 83, 84, is positioned at the outlet of each extruder, to accurately control the rate of polymer delivered to the mold roll sleeve. The finished fastener product 86 is stripped from the mold roll 80 by passing it around exit roll 88.

A backing material (not shown) may also be introduced to the resin forming a fastener product having a backing material formed of, for example, loop material, preformed film, nonwoven, printable cloth, a resiliently extensible substrate, woven fabric, paper or the like.

Referring now to FIG. 11, the hook-forming polymer is applied to the mold roll sleeve by an extruder 90, and most of the polymer is scraped form the surface of the mold roll sleeve by a doctoring blade 92, leaving a thin film of polymer, as described above with reference to FIG. 10. The base-forming polymer 94 is then laminated to the thin film of hook-forming, polymer while the latter is still on the mold roll, such as in the nip between the mold roll and roll 96, as shown.

Figure 12:
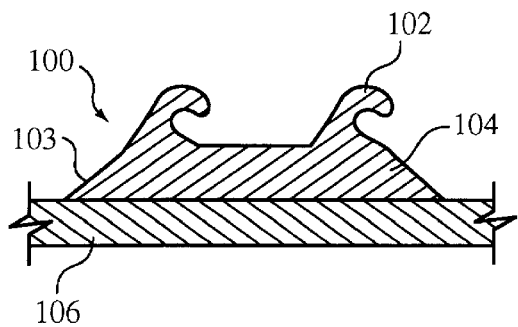
FIGS. 12–12D illustrate a multi-layer fastener product.
Figure 12A:
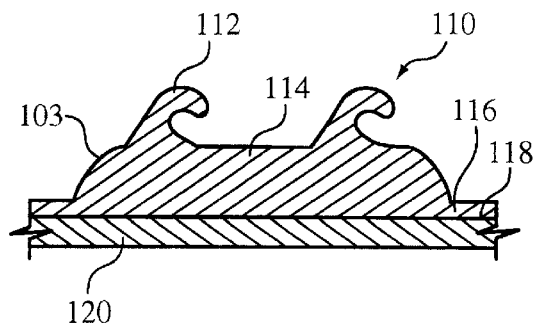
Figure 12B:
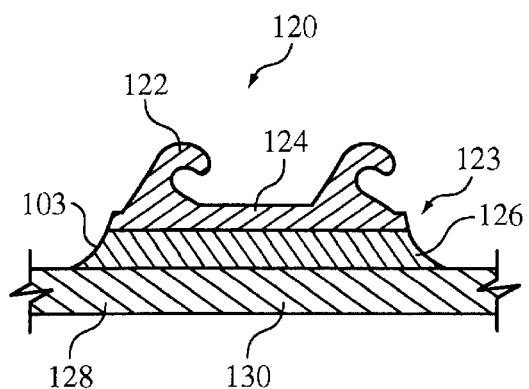
Figure 12C:
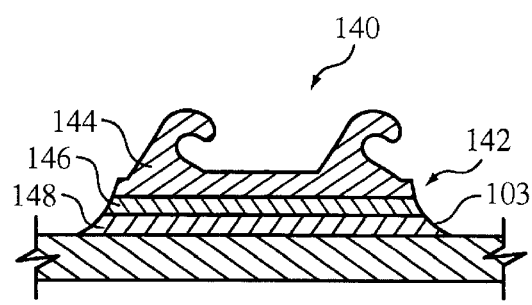
Figure 12D:
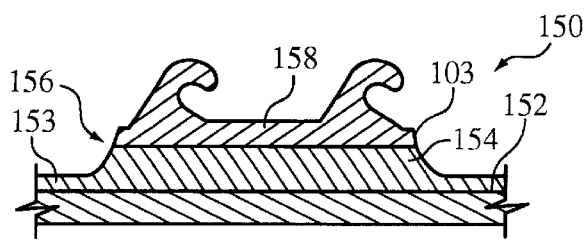

Examples of various fasteners that can be formed using the process shown in FIGS. 10 and/or 11 (or modifications of this process) are shown in FIGS. 12–12D.

FIG. 12 shows a fastener 100, in which the plateau 104 includes a chamfered edge 103 of less than 90 degrees, for example, a 45 degree chamfered edge 103, and the hooks 102 are formed of a first polymer and the base 106 is formed of a second polymer. Using the process shown in FIGS. 10 or 11, such a fastener can be formed by scraping substantially the entire first polymer off of the surface of the sleeve prior to applying the second polymer.

FIG. 12A shows a fastener 110, in which the hooks 112, the plateau 114, having a radiused edge 103, and the upper portion 116 of the base 18 are formed of a first polymer, and the lower portion 120 of base 118 is formed of a second polymer. Using the process shown in FIGS. 10 or 12, such a fastener can be formed by adjusting doctoring blade 46 away from the sleeve surface so that a thin layer of the first polymer remains on the mold roll surface when the second polymer is applied. When using a stiff first polymer and a flexible or stretchable second polymer, the layer of first polymer is preferably sufficiently thin, as determined by the positioning of the doctoring blade, to enable the rupture of the thin layer of first polymer upon the initial stretch of the second polymer layer, such as during the initial engagement of a diaper tab. Subsequently, the rigidity of the thin layer of the first polymer does not detract from the stretchability of the base of the fastener product.

FIG. 12B shows a fastener 120 having a plateau 123 with a radiused edge 103, in which the hooks 122 and an upper portion of the plateau 123 are formed of a first polymer 124 and the lower portion of the plateau 123 is formed of a second polymer 126, and the base 128 is formed of a third polymer 130. To form this fastener, the processes shown in FIGS. 10 or 11 are modified so that the first extruder applies an amount of the first polymer that only partially fills the mold cavities and the aperture, and then another extruder (not shown in FIGS. 10 or 11) applies the second hook-forming polymer to completely fill the aperture. The process then continues as shown in FIGS. 10 or 11, with scraping and application of the base-forming polymer by extruder. If the two polymers 124, 126 are not compatible, or do not adhere well to each other, a thin tie layer of adhesive, or a third polymer that adheres well to both polymers 124 and 126, can be applied between polymers 124 and 126. This can be accomplished by replacing an extruder with a co-extrusion die, or by other known methods of applying tie layers.

FIG. 12C shows a fastener 140, having a radiused edge 103, in which the hooks 142 are formed of three different polymers 144, 146, 148. This fastener would be formed in a manner similar to that described below with reference to FIG. 12D, adding a further extruder to apply the third plateau-forming polymer. This embodiment can provide combinations of properties difficult to obtain with only two polymers. Alternatively, the middle polymer 146 may be used as a "tie layer" to bond polymers 144 and 148 if, for example, these polymers are incompatible or do not adhere well to each other.

FIG. 12D shows a fastener 150, having a radiused edge 103, in which an upper layer 153 of the base 152 and a lower portion 154 of plateau 156 are formed of a first polymer, and the upper portion 158 of the plateau 156 is formed of a second polymer. This fastener would be formed by the process of FIGS. 10 or 11, by only partially filling the aperure of the sleeve using an extruder, and then completing the filling of the aperture with an additional extruder.

A number of embodiments of the invention have been described. Nevertheless, it will be understood that various modifications may be made without departing from the spirit and scope of the invention. For example, the fastener product may further include a backing material comprising, for example, loops, non-woven material, a printable cloth, or the like. Accordingly, other embodiments are within the scope of the following claims.

What is claimed is:

1. A method of making a fastener product having discrete regions of fastener element stems extending from a section of a strip-form base, the method comprising:
   providing a gap formed along a peripheral surface of a rotating mold roll, the mold roll having a plurality of cavities extending from the peripheral surface;
   positioning a compliant sleeve about the mold roll, the sleeve covering select ones of the plurality of cavities;
   continuously introducing molten resin to the gap such that the resin forms at least a part of the strip-form base of the product at the peripheral mold roll surface and at least partially fills a plurality of the cavities and the aperture, while the resin remains blocked from said selective ones of the cavities by the sleeve, to form fastener element stems as projections extending from the section of the strip form base, the sleeve compressing under pressure in the gap;
   solidifying the resin; and
   stripping the solidified resin from the peripheral surface of the mold roll by pulling the projections from their cavities.

2. The method of claim 1 wherein the sleeve resiliently compresses.

3. The method of claim 1 wherein the cavities are stem-shaped, the projections each extending from the base to a distal tip of the projection.

4. The method of claim 3 further comprising a step of deforming the distal tips to form loop-engaging heads on the projections.

5. The method of claim 1 wherein the cavities are shaped to form loop-engaging heads.

6. The method of claim 5 wherein hook-shaped fastener element projections are formed in the cavities.

7. The method of claim 1 further comprising introducing a backing material to the molten resin while the resin is disposed in the gap.

8. The method of claim 7 wherein the backing material is a nonwoven.

9. The method of claim 7 wherein the backing material is a printable cloth.

10. The method of claim 7 wherein the backing material is a plastic film.

11. The method of claim 7 wherein the backing material is resiliently extensible.

12. The method of claim 7 wherein the backing material is paper.

13. The method of claim 7 wherein the backing material is a woven fabric.

14. The method of claim 1 wherein positioning the sleeve about the mold roll further includes resiliently expanding the sleeve.

15. A method of making a fastener product having discrete regions of fastener element stems extending from a base comprising:
   providing a gap formed along a peripheral surface of a rotating mold roll, the mold roll having an array of cavities extending from the peripheral surface;
   positioning a sleeve about the mold roll, the sleeve having an outer surface and an inner surface and defining at least one aperture extending between the inner and outer surfaces to expose a region of the array of cavities, the aperture intersecting the inner surface of the sleeve at an inner opening that is smaller than an outer opening of the aperture at the outer sleeve surface;
   introducing the sleeve to the gap;
   continuously introducing molten resin to the gap such that the resin forms at least a part of the strip-form base of the product at the peripheral mold roll surface and at least partially fills the region of the array of cavities and the aperture to form fastener element stems as projections extending from an upper surface of a plateau, the plateau molded integrally with and extending from the base and the upper surface of the plateau is smaller in area than an overall area of the base covered by the plateau;
   solidifying the resin; and
   stripping the solidified resin from the peripheral surface of the mold roll by pulling the projections from their cavities.

16. The method of claim 15 wherein the cavities are shaped to form loop-engaging heads.

17. The method of claim 16 wherein hook-shaped fastener element projections are formed.

18. The method of claim 15 wherein the cavities are stem-shaped, the projections each extending from the base to a distal tip of the projection.

19. The method of claim 18 further comprising a step of deforming the distal tips to form loop-engaging heads on the projections.

20. The method of claim 15 further comprising introducing a backing material to the molten resin while the resin is disposed in the gap.

21. The method of claim 20 wherein the backing material is resiliently extensible.

22. The method of claim 20 wherein the backing material is a nonwoven.

23. The method of claim 20 wherein the backing material is a printable cloth.

24. The method of claim 20 wherein the backing material is a plastic film.

25. The method of claim 20 wherein the backing material is paper.

26. The method of claim 20 wherein the backing material is a woven fabric.

27. The method of claim 15 wherein an edge of the aperture is chamfered.

28. The method of claim 15 wherein an edge of the aperture is radiused.

29. The method of claim 15 wherein the sleeve comprises a compliant material to allow the sleeve to compress in the gap under pressure.

* * * * *